INVENTORS
William M. Giles &
BY   Clement M. Kucera
Walter J. Jason
ATTORNEY

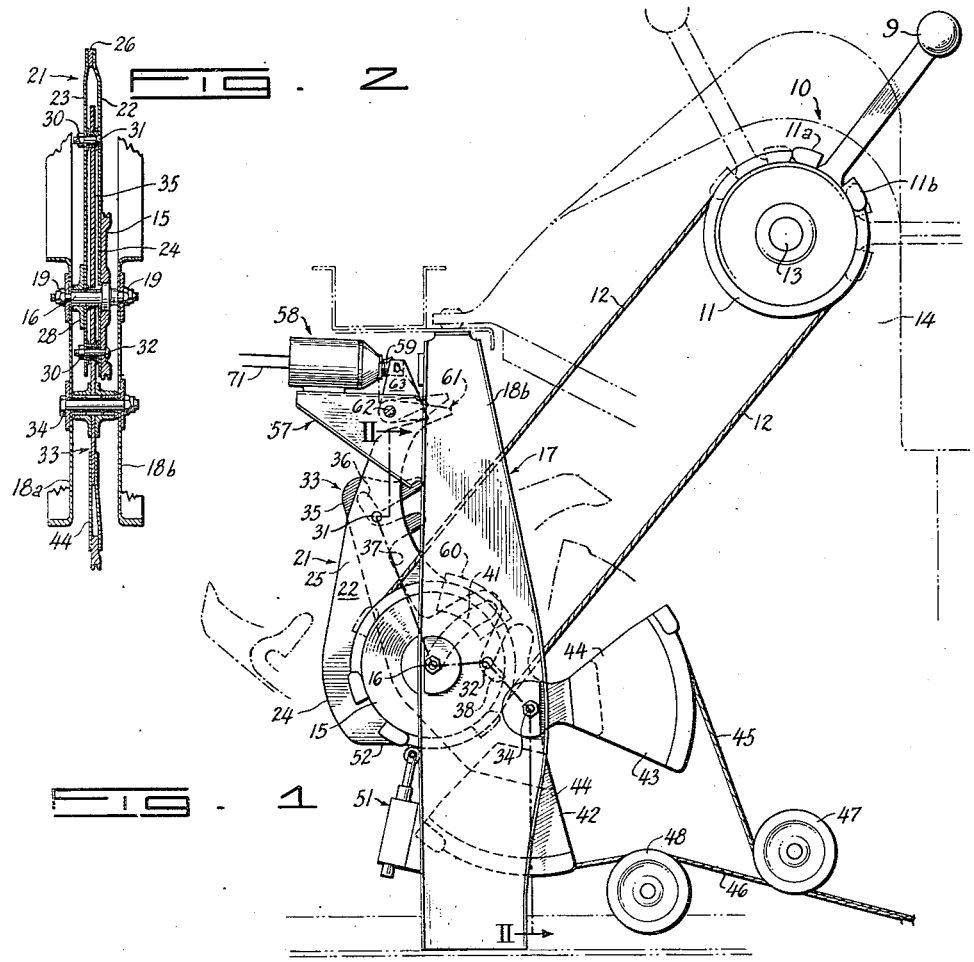
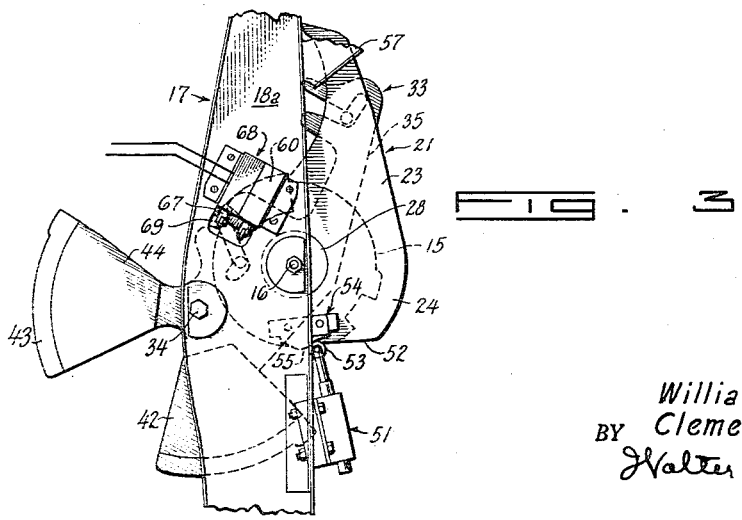

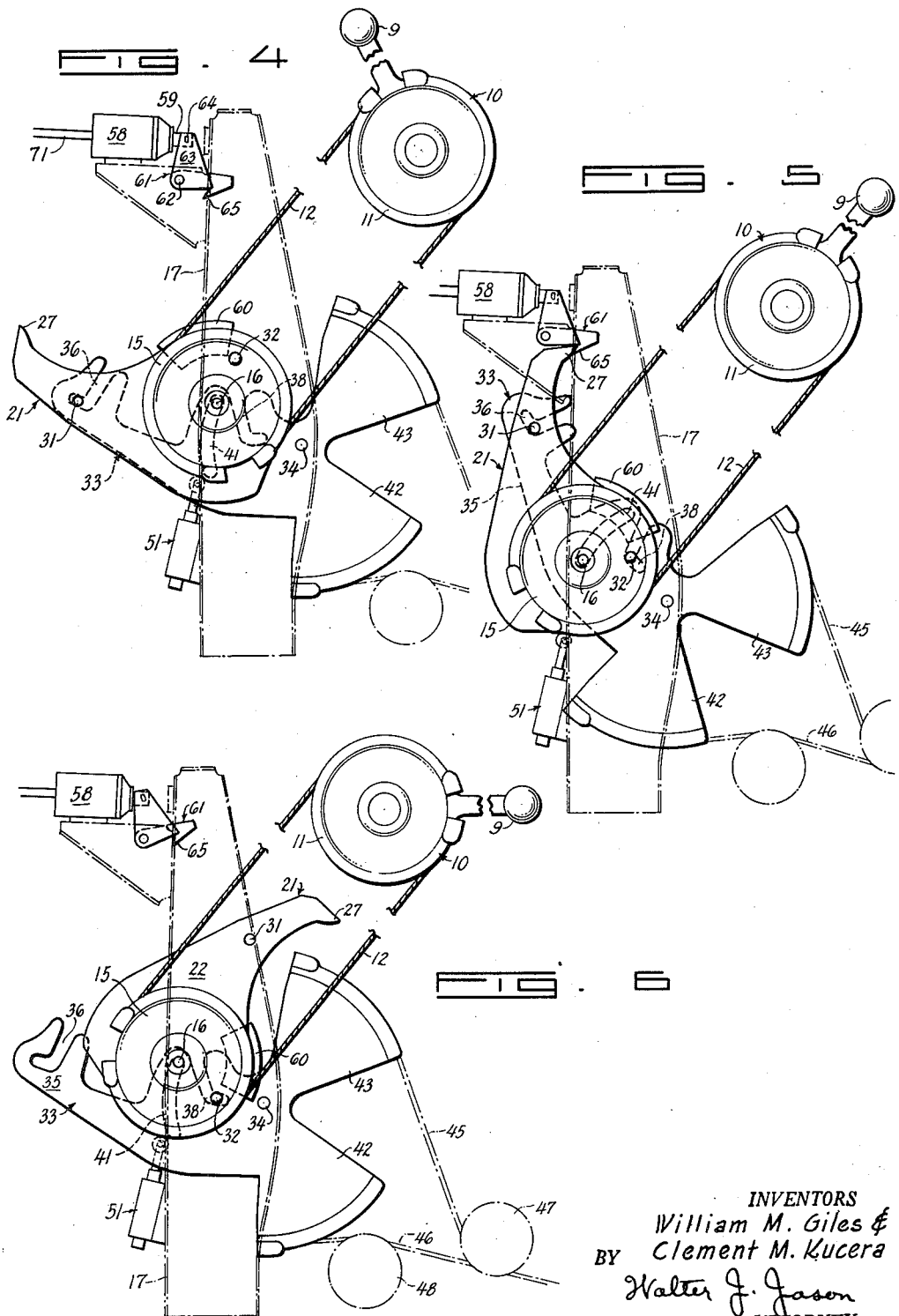

Patented Aug. 10, 1948

2,446,700

UNITED STATES PATENT OFFICE

2,446,700

THROTTLE CONTROL DEVICE OPERABLE TO CONTROL REVERSIBLE PITCH PROPELLERS

William M. Giles, San Diego, Calif., and Clement M. Kucera, Houston, Tex., assignors to Consolidated Vultee Aircraft Corporation, San Diego, Calif., a corporation of Delaware Application January 4, 1947, Serial No. 720,258

17 Claims. (Cl. 244—102)

This invention relates to throttle controls and more particularly to an improved form of throttle control operatively associated with a propeller reversing mechanism.

An object of the present invention is to provide an improved form of throttle control embodying a single manually operated lever which provides full range of engine throttle adjustment in normal operations and which is adapted to be operated to actuate the propeller reversing mechanism and further with the propeller in reverse to provide again engine throttle adjustment.

Another object of the invention resides in the provision of an improved form of throttle control which is adapted to effect the operation of propeller reversing mechanism and comprising means for preventing the inadvertent movement of the throttle lever beyond its neutral position and to prevent the inadvertent application of propeller braking power too quickly.

A further object of the invention lies in providing an improved throttle control for an airplane wherein the throttle control lever is actuable in a single direction to bring the engine from high R. P. M. condition to idling condition, effect operation of the propeller reversing mechanism and then to again speed up the engine to utilize the propellers in reverse pitch as a braking means for the airplane in landing.

A still further object of the invention is the provision of an improved form of throttle control for airplanes adapted to effect the operation of propeller reversing mechanism and which is operatively associated with the airplane landing gear and under the control thereof whereby operation of the propeller reversing mechanism by the throttle control cannot be obtained unless the airplane's landing wheels are in contact with the ground.

Other objects and features of the present invention will be readily apparent to those skilled in the art from the following specification and appended drawings illustrating certain preferred embodiments in which:

Figure 1 is a side elevational view of a throttle control mechanism according to the present invention;

Figure 2 is a sectional view taken on the line II—II of Figure 1;

Figure 3 is a view illustrating the reverse side of Figure 1 but with certain parts omitted for clarity;

Figure 4 illustrates the position of the various parts of the throttle control mechanism when the throttle control lever occupies full "on" position in the normal operation of the vehicle;

Figure 5 illustrates the position of the parts when the throttle control lever is in idling position;

Figure 6 illustrates the position of the parts after the propeller reversing mechanism has been actuated and the throttle control lever actuated to increase the speed of the engine to utilize the propeller as a braking agency;

Figure 7:
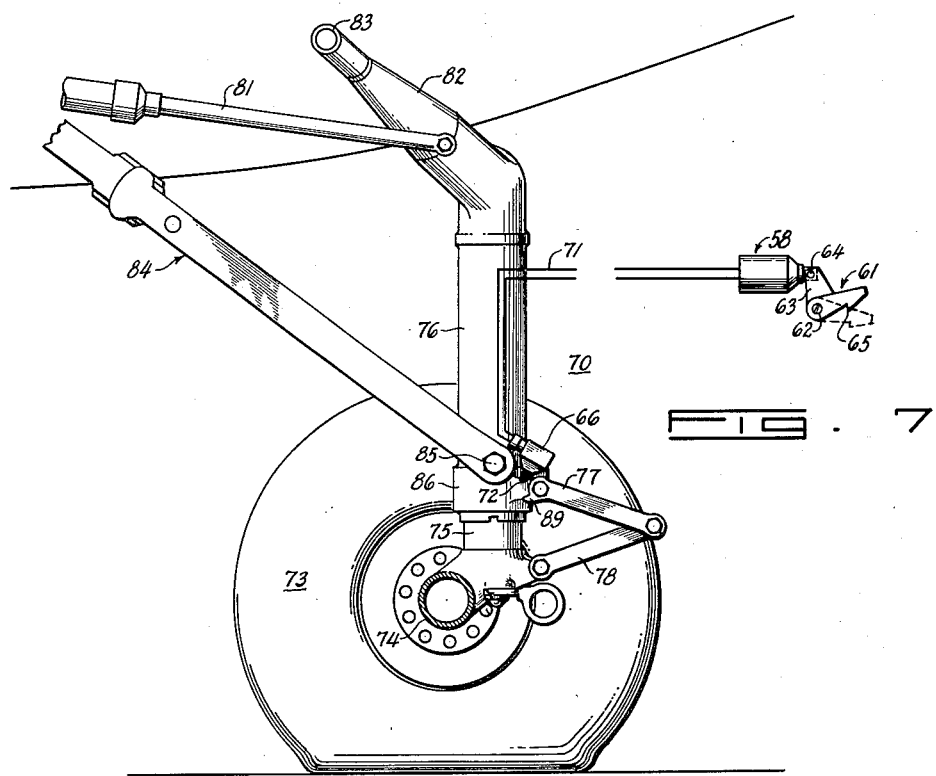
Figure 8:
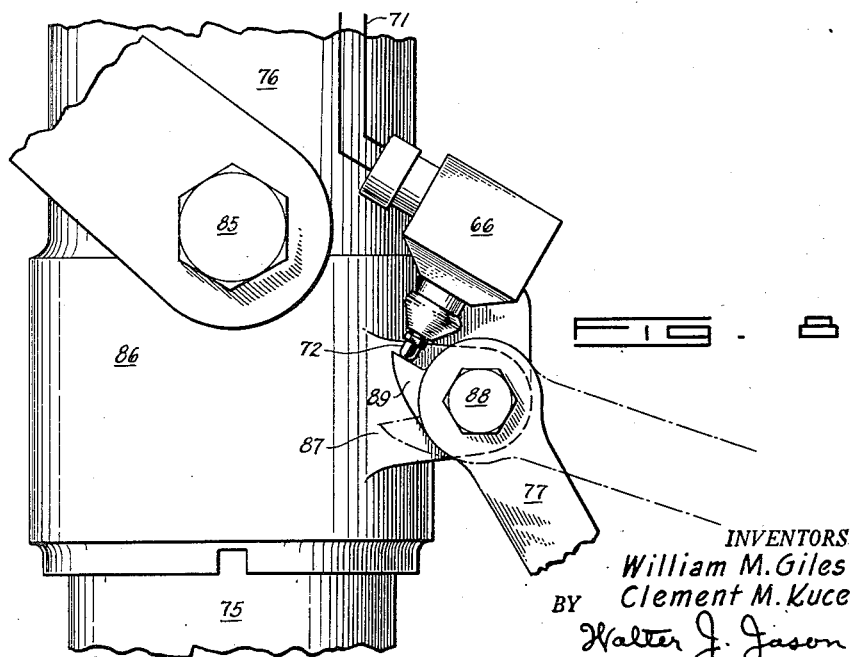

Figure 7 is a side elevational view of the landing gear assembly and in compressed position permitting the operation of an electric switch associated therewith which switch controls the operation of a latch associated with the throttle control mechanism; and Figure 8 is a partial and enlarged view illustrating certain of the elements of Figure 7 and their position when the landing gear assembly is extended.

Referring to the drawings and more particularly to Figure 1, the invention is shown as comprising a suitable manually movable engine throttle lever 10 embodying a handle portion 9 and a circular or disk-like portion 11 the periphery of which is grooved to accept cables 12 the upper ends of which are secured to the wheel 11 at the projections or lugs 11a and 11b provided thereon whereby movement of the cables 12 will be secured on movement of the throttle lever 10. The throttle lever 10 is rotatably mounted on a bearing shaft 13 which in turn is secured to a supporting pedestal 14 located in the pilot's compartment to place the throttle lever 10 within convenient reach of the pilot for operation by him. The lower ends of cables 12 are connected to a sheave-like member 15 which is positioned for rotation on a shaft 16 carried by a supporting structure 17 comprised of a pair of spaced elongated supporting brackets 18a and 18b, which brackets are attached to the framework of the airplane at the pilot's compartment and in a conventional manner. Nuts 19 are adapted to thread onto the ends of shaft 16 which extend exteriorly of the supporting brackets 18a and 18b to maintain the shaft 16 thereon. Cables 12 provide an operative connection between the throttle lever 10 and sheave 15 whereby rotation of the former in clockwise and counterclockwise directions will effect a corresponding rotation of the latter.

Pivotally mounted on the same bearing shaft 16 as the sheave 15 is a lever 21 which is comprised of two plate-like members 22 and 23 in side by side relation and located spaced from each other. The members 22 and 23 each embody a substantially circular portion 24 having an aperture provided therein through which shaft 16 passes and an elongated arm 25 which extends from the portion 24. The upper ends of arms 25 are joined together by a block-like element 26 which may be welded in position or secured in any other well-known manner. Further, the upper ends of the arms 25 of the elongated members 22 and 23 at the point where they are connected together are formed, as shown in the drawings and as best seen in Figures 4, 5, and 6, to effect a projecting portion or latching tip 27, whose function will be hereinafter described.

The plate-like member 22 at the portion 24 thereof is secured, as by welding, to the inwardly directed face of the sheave-like member 15, as best shown in Figure 2, to thereby tie lever 21 to sheave member 15 so that rotation of this latter member 15 by throttle lever 10 will rotate or pivot lever 21 about the shaft 16. A flanged member 28 through which shaft 16 passes is secured to the side of the other plate-like member 23 of lever 21 to serve as a bracing means therefor.

The lever 21 is provided with a pair of transverse pins 31 and 32, the pin 31 being carried by the elongated arms 25 and located spaced from the upper ends thereof. The second transverse pin 32 is carried at the lower end of lever 21, passing through aligned apertures provided in sheave 15 and in the portions 24 of lever 21. Nuts 30 are threaded onto the ends of pins 31 and 32 to retain them in position.

A second pivotally mounted lever 33 is provided on the supporting structure 17 and pivots upon a bearing shaft 34 carried by the supporting brackets 18a and 18b and which is located on the brackets at a point below the mounting of bearing shaft 16. Lever 33 is directly connected to the engine carburetor in a manner to be described and the movements of lever 33 govern the opening and closing of the engine throttle. The lever 33 embodies two sector elements 42 and 43 and a flat elongated member 35, the bearing shaft 34 passing through the latter member 35. Elongated member 35 extends for most of its length from the bearing shaft 34 toward the upper end of lever 21 (as is best seen in Figures 1 and 2) and lies disposed in the space provided between the plate-like members 22 and 23 which comprise lever 21. This elongated member 35 is adapted to move within this space under certain conditions, as will be explained hereinafter.

The upper end of elongated member 35 has formed in its upper end a generally L-shaped locking slot 36, with the entrance to the slot leading inwardly from the edge 37 of the member 35 and with the shorter leg of the L being directed upwardly. A second generally L-shaped locking slot 38 is provided in the elongated member 35, which second slot is located near the shaft 34 which effects the pivotal mounting for lever 33. The entrance of this second L-shaped slot 38 is directly inwardly from edge 37 of member 35 and has its shorter leg directed generally toward the bearing shaft 34. The slot 36 is adapted to accept the upper transverse pin 31 and the slot 38 is adapted to receive the second transverse pin 32 carried by lever 21. Upper pin 31 on rotative movement of lever 21 cooperates with its slot 36 to effect movement of lever 33 to provide engine throttle adjustments when the throttle lever 10 is actuated between its neutral or engine idling position and power "on" position in the normal operation of the vehicle; and lower pin 32 on rotative movement of lever 21 by throttle lever 10 cooperates with slot 38 to effect movement of lever 33 to effect engine throttle adjustments when the propeller is in reverse pitch for braking purposes or for backing up of the vehicle. These movements and the operations of pins 31 and 32 will be more fully discussed hereinafter.

The elongated member 35 of lever 33 is provided with still a third slot 41 of generally arcuate shape and through which extends the bearing shaft 16. The edges defining the two ends of the elongated slot 41 are adapted to be moved into engagement with the shaft 16 as lever 33 is moved by lever 21 through the pin and slot connections above described. The ends of slot 41 serve as stops to limit the amount of rotative movement to be had by lever 33 and lever 21, and with lever 21 being connected to throttle lever 10 these stops will determine the extent and amount of movement of the throttle lever 10 to effect engine throttle adjustments. The ends of slot 41 serve to locate and define the positions that will be assumed by the throttle lever 10 when the engine is idling and when it is at full power. The arcuate slot 41 is of a determined and sufficient length that the throttle lever 10 can be advanced from engine-idling position to full power position before a slot end engages shaft 16 to stop further travel.

As stated hereinbefore lever 33 in addition to the flat elongated member 35 embodies two sector elements 42 and 43. These sector elements are rigidly secured to the member 35 by connecting plates 44, or may be secured thereto in any other well known manner or if desired may be formed integrally with member 35. To the sectors 42 and 43 are secured respectively cables 45 and 46 which pass over pulleys 47 and 48 and connect to the carburetor mechanism (not shown). Thus pivotal movement of lever 33 by lever 21 will by actuation of cables 45 and 46 effect the desired engine throttle adjustments to control the speed of the engine.

Mounted on the supporting structure 17 near the upper end thereof and extending at a right-angle therefrom is a bracket element 57. Positioned on the bracket 57 is a conventional solenoid member 58 having the usual rectilinearly movable core or plunger 59. Located on bracket 57 adjacent the solenoid member 48 is a latching lever 61. The latching lever 61 is pivotally secured to bracket 57 as by a stud 62 and has an arm 63 which is pivotally joined to the end of plunger 59 as at 64 so that latch 61 will rotate upon its pivot on movement of plunger 59. The latching lever 61 carries a downwardly extending hook portion 65 which is adapted to be engaged by the latching tip 27 provided at the upper end of lever 21. Movement of the plunger 59 inwardly and outwardly of the solenoid 58 on energization and deenergization of solenoid 58 will effect pivotal movement of latching lever 61 to carry the hook 65 into and out of engaging position with tip 27 of lever 21. It is readily seen that the hook 65 in its normal or latching position limits the amount of travel, in a clockwise direction, that is to be had by the lever 21. Throttle lever 10 when it has moved lever 21 to the position where tip 27 thereof engages latch hook 65 lies in its throttle-closing or engine-idling position, as illustrated in Figures 1 and 5. With the solenoid 58 energized and plunger 59 drawn into solenoid 58 the hook 65 will be rotated out of latching position and throttle lever 10 is then adapted to rotate further the lever 21 in a clockwise direction to effect further engine throttle adjustments, as will be more fully described. The solenoid 58 is connected to any suitable source of electrical power such as a battery, not shown.

To prevent the throttle lever 10 from being moved directly through its neutral or engine-idling position when latch 61 has been actuated by solenoid 58 to position hook 65 out of the path of movement of tip 27 of lever 21 a means is provided to halt, temporarily, continuous movement of throttle lever 10. This means is comprised of a slidably mounted spring-biased detent 51 carried by the supporting structure 17 and positioned thereon at a point below the bottom edge 52 of lever 21. The detent 51 embodies a wheel 53 which is adapted to engage a surface of a cam member 54. The cam member 54 is rigidly affixed to lever 21 and projects a curved surface 55 below the bottom edge 52 which will be engaged by the detent 51 when lever 21 is moved beyond the hook 65. Detent 51 serves then to halt the movement of throttle lever 10. To move throttle lever 10 further the operator must apply additional manual force which will cause camming surface 55 to over-ride the detent 51 and the throttle lever 10 may then move to effect the desired engine throttle adjustments. Thus providing detent means as described prevents the pilot from moving the throttle lever 10 from a power "on" position through its neutral position and without a halt directly into power "on" position again but with the propeller reversed and thereby prevents the pilot from inadvertently and too quickly applying braking power. The manual force he applies to retreat the throttle lever 10 from a power "on" position for normal operations will be broken or slowed considerably by detent 51 dependent on the strength with which the pilot is shutting off the throttle. It is possible for a pilot to carry throttle lever 10 right through the neutral position by the application of greater force than he ordinarily would use if he deliberately desires to immediately pass into the braking condition. At any rate detent 51 whether it serves to halt throttle lever 10 or just to slow its continuous movement down will give warning to the operator that further application of force to the throttle lever 10 will mean that this force will be used for braking purposes.

A camming plate 60 is rigidly affixed to the lever 21 upon the portion 24 thereof and is movable therewith. This camming plate 60 is adapted to effect actuation of the contact actuating arms 67 of a conventional electric switch 68 which is secured to the outer face of supporting bracket 18a. The contact actuating arms 67 normally extend through an opening 69 provided in the supporting bracket 18a and into the path of movement of the camming plate 60. The electric switch 68 is provided for the purpose of governing the operation of the propeller reversing mechanism (not shown). On actuation of the contact actuating arms 67 by cam plate 60 to close the contacts of switch 68 a circuit is completed to the propeller reversing mechanism to bring about the reversing of propeller pitch which propeller condition is required for the braking operation. In the normal operations of the throttle lever 10 to effect engine throttle adjustments the camming plate 60 does not pass the opening 69 because lever 21 carrying the plate 60 is engaged by latching lever 61 and therefore its travel is limited. However, when the latching lever 61 has been moved to disengage from lever 21 which occurs when the airplane is on the ground, as will be hereinafter fully described, the throttle lever 10 is free to move lever 21 further in a clockwise direction. This will carry the camming plate 60 over the contact actuating arms 67 to operate switch 68 to effect actuation of the propeller reversing mechanism and place the propellers in reverse pitch. With the propellers in reverse pitch the throttle lever 10 can then effect engine throttle adjustments to utilize the power of the engine for braking purposes, or to back the vehicle.

The particular construction of the switch 68 forms no part of the present invention and any conventional switch whose contacts are adapted to be moved to circuit making position through actuating arms disposed exteriorly of the switch may be used.

Further the details and construction of the propeller reversing mechanism do not constitute a part of this invention. This invention contemplates the use of any conventional propeller reversing mechanism whose automatic operation is under the control of an electric switch remotely located therefrom.

The operation of the solenoid 58 is under the control of a switch 66 which is located at the retractable landing gear 70. Electrical leads 71 interconnect the switch 66 with the solenoid 58. The switch 66 is of conventional design and includes a slidably mounted contact actuator pin 72 which on movement into the switch housing, by means to be described, is adapted to move the normally engaged contacts, not shown, to disengaged position to break the circuit to the solenoid 58 for deenergization thereof. The actuator pin 72 is normally spring biased outwardly and the contacts of switch 66 are normally engaged to complete the solenoid circuit and effect energization of solenoid 58. The particular construction of switch 66 forms no part of the present invention and therefore the specific structural details thereof are not illustrated. Any switch may be used wherein the contacts are normally closed and an actuator pin is provided which will act to hold the contacts in disengaged position.

The retractable landing gear 70 with which switch 66 is associated, as shown in Figures 7 and 8, is of conventional design and comprises a landing gear wheel 73 rotatably mounted upon an axle 74 carried at the lower end of a piston 75 which is adapted to telescope into a conventional shock absorbing strut cylinder 76 which may be of the oleo-pneumatic type. Suitable scissor type torque links 78 and 77 are pivotally connected respectively to the piston 75 and the cylinder 76. The torque links 77 and 78 while permitting piston 75 to reciprocate within cylinder 76 serve to prevent rotation of the piston 75 relative to the cylinder 76 and thereby act to maintain proper running alignment of the wheel 73 with respect to the airplane.

A usual hydraulically operated actuated rod 81 is connected to an extension 82 provided on the shock absorbing strut cylinder 76 and serves to retract and extend the landing gear 70 about a usual pivotal connection 83 as required. A strut brace 84 is connected to the cylinder 76 as at 85. A sleeve member 86 is disposed at the lower end of cylinder 76 and is provided with an ear portion 87 to which the torque link 77 is pivotally connected by the bolt 88. A lug 89 is formed on the upper end of torque link 77 and is adapted to engage the contact actuator pin 72 of switch 66.

which switch 66 is also mounted in a suitable manner on sleeve member 86.

Figure 8 illustrates the normal position of torque link 77 which is assumed when piston 75 is extending from cylinder 76. In this position of torque link 77 the lug 89 carried thereby is forced against the end of actuator pin 72 to move it into the switch housing of switch 66 and effect the disengagement of its contacts, as has been described. This breaks the circuit to the solenoid 58 so that it is normally deenergized.

On landing of the airplane and contacting of the landing gear wheel 73 with the ground, piston 75 will be telescoped into the cylinder 76, as shown in Figure 7; this movement will pivot the torque link 77 about its pivot 88 to carry lug 89 out of engagement with actuator pin 72 which is then free to move outwardly and permit the contacts of switch 66 to engage and complete the circuit to solenoid 58, energizing it to retract plunger 59 to effect pivotal movement of latching lever 61 in a counterclockwise direction out of its latching position. Thus the latching lever 61 will normally occupy a latching position as long as the landing gear wheel 73 is off the ground and the torque link 77 is in engagement with the switch actuator pin 72, and is movable from this position only when the wheel 73 is in contact with the ground to effect compression of the shock absorber to force piston 75 into its housing cylinder 76.

It is understood that in describing the torque link 77 as the operating means for switch 66 does not limit us to only this method of obtaining the desired actuation of contact actuator pin 72 for any structural combination associated with the landing gear which on compression of the piston 75 is adapted to effect the operation of switch 66 to cause energization of solenoid 58 and actuation of the latching lever 61 can be utilized in the present invention.

The operation of the throttle control mechanism above described is as follows:

Considering the throttle lever 10 to be in its throttle closing or engine idling position as illustrated in Figure 5 and the latch 61 to be in latching position by reason of the fact that the aircraft is in flight the throttle lever 10 will be moved counterclockwise to open the throttle and apply power to the engine. Figure 4 indicates the position assumed by the throttle lever 10 when the throttle is full open. In advancing the throttle lever 10 from the position of Figure 5 to that of Figure 4 the lever 21 is actuated by cables 12 whereby the pin 31 carried by lever 21 will be moved from the longer leg of the L-shaped slot 36 provided by lever 33 into the shorter leg thereof riding or camming along a defining edge of this shorter leg of slot 36 and thereby applying force to the lever 33 to cause it to rotate about its pivot 34 to move the carburetor connecting cables 45 and 46 to effect the desired engine throttle adjustments. In returning throttle lever 10 toward its neutral position pin 31 located in the shorter leg of slot 36 will carry the lever 33 with it as lever 21 is rotated clockwise gradually moving downwardly out of this shorter leg as the lever 21 approaches the latch 61 and completely emerges when the throttle lever 10 reaches the position of Figure 5. The movement of throttle lever 10 between the positions of Figures 4 and 5 is used when power is required for forward movement of the airplane. It is noted that, with latch 61 in latching position the pilot cannot move throttle lever 10 beyond the position of Figure 5 to inadvertently place the propeller in reverse pitch.

Now assuming that the airplane has come in for a landing and its landing gear 70 is extended and the wheel 73 is in contact with the ground the piston 75 will be telescoped into the cylinder 76 and the torque link 77 will have pivoted about its pivot 88 to move lug 89 out of engagement with contact actuator pin 72 permitting the latter to move outwardly of the switch 66 whereupon the contacts of switch 66 move to circuit making position to complete the circuit of the solenoid 58 to energize it. Solenoid 58 on being energized will retract its plunger 59 pivoting latch 61 counterclockwise to move it out of latching position.

With the latch 61 so located the pilot may now actuate the throttle lever 10 to effect a braking condition. Assuming that the pilot desires to utilize the propeller to brake the forward progress of the airplane he will move the throttle lever 10 clockwise and through the neutral position of Figure 5 to effect rotational movement of lever 21 in the same direction. This movement will carry the pin 32 provided by lever 21 into the shorter leg of the L-shaped slot 38 associated with pin 32. The pin 32 will ride or cam on a defining edge of this shorter leg to thereby apply a force to lever 33 which contains slot 38 to rotate this lever and effect actuation of the carburetor control cables 45 and 46 to provide power to the engine as wanted to rotate the propeller at such speeds as will give the desired braking force. The extent to which throttle lever 10 can be moved in this clockwise direction is shown in Figure 6. For in this position an end of the arcuate slot 41 has engaged the shaft 16 and lever 33 can be rotated no further about its pivot 34. The arcuate slot 41 also determines the extent of movement of throttle lever 10 in a counterclockwise direction. Figure 4 illustrates the furthest that throttle lever 10 may be moved in this latter direction, the end of arcuate slot 41 again being in engagement with shaft 16 to prevent further rotation of lever 33.

It is here noted that pin 31 carried by lever 21 effects rotation of the lever 33 to provide engine throttle adjustments when power is desired to effect forward progress of the airplane. Pin 31 is effective in the movement of throttle lever 10 between the positions of Figures 4 and 5. Pin 32 provides for movement of the lever 33 to obtain engine throttle adjustments when engine power is desired to brake the forward motion of the airplane. Pin 32 is therefore effective between the positions of the throttle lever 10 illustrated by Figures 5 and 6 to brake or back the airplane.

It is further noted that both pins 31 and 32 rotate the lever 33 in the same directions about its pivot 34 to move the carburetor cables 45 and 46 to adjust the throttle.

To move throttle lever 10 from its engine-idling position of Figure 5 to the position of Figure 6 the pilot must apply a sufficient force to the throttle lever to cause the camming surface 55 on lever 21 to override the detent 51. This insures against the pilot inadvertently moving the throttle lever 10 to bring about a braking condition. Movement of lever 21 to override detent 51 will cause the camming plate 60 on lever 21 to move upon the contact actuating arms 67 of electric switch 68 to operate it to complete the circuit to the propeller reversing mechanism and effect a reversing of the pitch of the propeller so that it may be utilized for braking purposes. Further clockwise movement of the throttle lever

10 when the propeller reversing mechanism has been operated will provide additional power to the engine to rotate the propeller at the desired speed and secure the braking force wanted.

In case of failure of the electrical system for the solenoid 58 whereby latch 61 cannot be moved to unlatched position a manually actuated connecting rod may be joined to the latch 61 and have an end thereof located in the pilot's compartment for operation by him.

While certain preferred embodiments of the invention have been specifically disclosed it is understood that the invention is not limited thereto as many variations will be readily apparent to those skilled in the art and the invention is to be given its broadest possible interpretation within the terms of the following claims.

We claim:

1. In mechanism of the character described, throttle control means to effect throttle opening and closing comprising a throttle lever, means including a pivoted member actuable to effect throttle adjustment, a plurality of means under the control of said throttle lever each adapted to separately actuate said pivoted member; one of said plurality of means being movable upon movement of said throttle lever in a first direction to rotate said pivoted member to effect throttle adjustment between "off" and "on," and another of said plurality of means being movable upon movement of said throttle lever in a reverse direction to rotate said pivoted member to effect throttle adjustment between "off" and "on," and means operatively associated with said throttle lever and operable thereby for effecting the operation of propeller reversing mechanism.

2. Engine power control mechanism adapted to effect actuation of propeller reversing mechanism comprising a throttle lever adapted for movement on each side of a neutral position to govern throttle opening and closing, means normally acting to restrict movements of said throttle lever to one side of its neutral position, means for effecting the operation of propeller reversing mechanism, means associated with said means for restricting the movements of the throttle lever for actuation thereof to permit movement of said throttle lever through its neutral position for power control movement on the other side of said neutral position, and means providing an operative connection between said throttle lever and said actuating means for the propeller reversing mechanism whereby said throttle lever controls the operation of said actuating means.

3. In mechanism for controlling the power of an engine and for causing the operation of propeller reversing mechanism, a throttle lever adapted to be moved from a neutral position to power positions on each side of said neutral position, means including a pivoted member actuable by said throttle lever to effect throttle opening and closing, means operatively interconnecting said throttle lever and said actuable means whereby the movements of the latter are under the control of the former, means operable by said throttle lever for effecting the operation of propeller reversing mechanism, releasable means normally acting to prevent movement of said throttle lever through its neutral position, and remote controlled means automatically operable to actuate said releasable means to permit movement of said throttle lever through its neutral position to operate said actuable means to effect throttle opening and closing.

4. Engine throttle control apparatus operative to actuate propeller reversing mechanism comprising a throttle lever adapted for movement on each side of a neutral position to govern throttle opening and closing, means normally acting to restrict said throttle lever for movement on one side of its neutral position, means operative on said restricting means to permit movement of said throttle lever through its neutral position, means actuable to effect throttle adjustments, a plurality of means under the control of said throttle lever each adapted to separately actuate said actuable means, the position that said throttle lever occupies relative to its neutral position determining which of said plurality of means is effective to actuate said actuable means, and means operatively associated with said throttle lever and operable thereby for effecting the operation of propeller reversing mechanism.

5. In mechanism of the character described, a throttle lever, means including a pivoted member actuable by said throttle lever to effect throttle opening and closing, means associated with said pivoted member and operable thereby upon movement of said throttle lever through its neutral position for effecting the operation of propeller reversing mechanism, movable means normally operating to prevent said pivoted member acting to effect the operation of the propeller reversing mechanism and remotely controlled means for moving said movable means to inoperative position.

6. Apparatus for controlling engine power and for effecting the operation of propeller reversing mechanism comprising a throttle lever, a pivotal member for effecting throttle opening and closing, a pivotal member providing an operative interconnection between said throttle lever and said first mentioned pivotal member whereby the throttle lever can move said first mentioned pivotal member, and means actuable by one of said pivotal members for operating propeller reversing mechanism.

7. Apparatus for controlling engine power and for effecting the operation of propeller reversing mechanism comprising a throttle lever, a pivotal member for effecting throttle opening and closing, a pivotal member actuable by said throttle lever, a pair of means adapted to be moved by said throttle lever to interconnect said pivotal members for common movement, with one of said pair of means being movable into interconnecting position upon movement of said throttle lever in a first direction and the other being movable into interconnecting position upon movement of said throttle lever in reverse direction, and means for operating propeller reversing mechanism, said means being operatively connected to said pivotal member actuable by said throttle lever.

8. Apparatus for controlling engine power and for effecting the operation of propeller reversing mechanism comprising a throttle lever, a pivotal member for effecting throttle opening and closing, a pivotal member actuable by said throttle lever, pin and slot means interconnecting said pivotal members for common movement, and means for operating propeller reversing mechanism, said means being operatively associated with said pivotal member actuable by said throttle lever.

9. Apparatus for controlling engine power and for effecting the operation of propeller reversing mechanism comprising a throttle lever having a neutral position and adapted to be moved on each side of this neutral position to control engine power, a pivotal member for effecting throttle opening and closing, a pivotal member actuable by said throttle lever, a plurality of pin and slot means individually and separately operative to provide interconnection between said pivotal members for common movement, the position of said throttle lever relative to its neutral position determining which of said pin and slot means is effective to provide said interconnection, and means for operating propeller reversing mechanism, said means having an operative connection with said pivotal member actuable by said throttle lever.

10. Apparatus for controlling engine power and for effecting the operation of propeller reversing mechanism comprising a throttle lever, a movable member for effecting throttle opening and closing, a pivotal member actuable by said throttle lever, means providing an operative interconnection between said movable member and said pivotal member, means actuable by said pivotal member for operating propeller reversing mechanism, and means operative on said pivotal member to prevent actuation by the pivotal member of the means for operating propeller reversing mechanism.

11. Apparatus for controlling engine power and for effecting the operation of propeller reversing mechanism comprising a throttle lever having a neutral position and being adapted to be moved on each side thereof to control engine power, a movable member for effecting throttle opening and closing, a pivotal member actuable by said throttle lever, means interconnecting said movable member and said pivotal member whereby the latter effects movement of the former, latch means engageable with said pivotal member to restrict the movements thereof and prevent movement of said throttle lever through its neutral position, means associated with said pivotal member for operating propeller reversing mechanism, said means being operative when said throttle lever is movable through its neutral position, and means for moving said latch means to release said pivotal member to permit movement of said throttle lever through its neutral position.

12. Apparatus for controlling engine power and for effecting the operation of propeller reversing mechanism comprising a throttle lever having a neutral position and being adapted to be moved on each side of said neutral position to control engine power, a movable member for effecting throttle opening and closing, a pivotal member actuable by said throttle lever, a first means operatively interconnecting said movable member and said pivotal member whereby the latter may move the former when said throttle lever is movable on one side of its neutral position, a second means for operatively interconnecting said movable member and said pivotal member for movement together when said throttle lever is movable on the opposite side of its neutral position, latching means engageable by said pivotal member to restrict the movements thereof and prevent said throttle lever being moved through its neutral position, means actuable by said pivotal member for operating propeller reversing mechanism, said means being operative when said throttle lever is movable through its neutral position, and means for moving said latching means to release said pivotal member whereby said throttle lever may be moved through its neutral position and thereafter moved to control engine power.

13. In an airplane, landing gear, mechanism for controlling the power of an engine and for effecting the operation of propeller reversing mechanism comprising a throttle lever, means actuable by said throttle lever upon movement of said throttle lever on each side of its neutral position to effect throttle opening and closing, means for operating propeller reversing mechanism, said means being associated with said actuable means and being operable thereby on movement of said throttle lever on a predetermined side of its neutral position, and means under the control of said landing gear for controlling the operation of said actuable means whereby said means for operating propeller reversing mechanism may be operated by said actuable means only when said landing gear is in contact with the ground.

14. In an airplane, landing gear, mechanism for controlling the power of an engine and for causing the operation of propeller reversing mechanism comprising a throttle lever adapted to be moved from a neutral position to power positions, means actuable by said throttle lever to effect throttle opening and closing, means operatively interconnecting said throttle lever and said actuable means whereby the movements of the latter are under the control of the former, means operable by said throttle lever for effecting the operation of propeller reversing mechanism, releasable means normally acting to prevent movement of said throttle lever, through its neutral position, and means under the control of said landing gear for actuating said releasable means to permit movement of said throttle lever through its neutral position to operate said actuable means to effect throttle opening and closing.

15. In an airplane, landing gear, engine power control mechanism adapted to effect actuation of propeller reversing mechanism comprising a throttle lever adapted for movement on each side of a neutral position to govern throttle opening and closing, means normally acting to restrict movements of said throttle lever to one side of its neutral position, means for controlling the operation of said movement restricting means and adapted to actuate it to permit movement of said throttle lever through its neutral position for power control movement on the other side of said neutral position, means operatively interconnecting said controlling means with said landing gear whereby said controlling means is operative only when said landing gear is in contact with the ground, and means operatively associated with said throttle lever for effecting the operation of propeller reversing mechanism.

16. In an airplane, landing gear, a throttle lever, means actuable by said throttle lever to effect throttle opening and closing, means associated with said actuable means and operable thereby for effecting the operation of propeller reversing mechanism, movable means normally operating to prevent said actuable means acting to effect the operation of the propeller reversing mechanism, means for effecting the actuation of said movable member to inoperative position, said latter means being disposed on said landing gear and having an operative connection therewith whereby the landing gear controls the operation thereof so that it cannot effect the actuation of said movable member to inoperative position unless said landing gear is in contact with the ground.

17. In an airplane, landing gear, engine throttle control apparatus operative to actuate propeller reversing mechanism comprising a throttle lever, movable means for effecting throttle opening and closing, means interconnecting said throttle lever and said movable means whereby the former may effect movement of the latter, means controlled by said throttle lever for the operating of propeller reversing mechanism, electromagnetically operated latch means engageable with said interconnecting means to prevent said throttle lever operating said means for operating propeller reversing mechanism, an electric switch means disposed on said landing gear, said electric switch means being adapted to control the movements of said electromagnetically operated latch means, and means carried by said landing gear for operating said electric switch means when said landing gear is in contact with the ground to effect actuation of said electromagnetically operated latch means to unlatching position to disengage said interconnecting means to permit said throttle lever to be operated to effect actuation of the means for operating propeller reversing mechanism.

WILLIAM M. GILES.
CLEMENT M. KUCERA.

REFERENCES CITED

The following references are of record in the file of this patent:

UNITED STATES PATENTS

| Number | Name | Date |
| --- | --- | --- |
| 1,458,214 | McCauley | June 12, 1923 |
| 1,693,451 | McCauley | Nov. 27, 1928 |
| 1,694,220 | Jenkins | Dec. 4, 1928 |
| 2,242,314 | Martin | May 20, 1941 |
| 2,402,065 | Martin | June 11, 1946 |